(12) United States Patent
Mitti et al.

(10) Patent No.: US 9,710,720 B2
(45) Date of Patent: Jul. 18, 2017

(54) SYSTEM AND METHOD OF IMAGE ANALYSIS FOR AUTOMATED ASSET IDENTIFICATION

(71) Applicant: General Electric Company, Schenectady, NY (US)

(72) Inventors: Aaron Richard Mitti, Atlanta, GA (US); Brian David Jeffrey, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 43 days.

(21) Appl. No.: 14/700,078

(22) Filed: Apr. 29, 2015

(65) Prior Publication Data

US 2016/0321513 A1 Nov. 3, 2016

(51) Int. Cl.
*G06K 9/00* (2006.01)
*G06K 9/32* (2006.01)

(52) U.S. Cl.
CPC ................... *G06K 9/3258* (2013.01)

(58) Field of Classification Search
CPC ............................................ G06K 9/18–9/186
See application file for complete search history.

(56) References Cited

U.S. PATENT DOCUMENTS

| | | | | |
|---|---|---|---|---|
| 9,098,747 B1 * | 8/2015 | Stewart | ............... | G06K 9/00651 |
| 2007/0139182 A1 * | 6/2007 | O'Connor | ............ | G08B 27/006 |
| | | | | 340/521 |
| 2007/0146159 A1 * | 6/2007 | Kato | ...................... | B61L 25/025 |
| | | | | 340/8.1 |
| 2007/0171431 A1 * | 7/2007 | Laflamme | .............. | G01C 11/02 |
| | | | | 356/602 |
| 2008/0310765 A1 * | 12/2008 | Reichenbach | ..... | G06K 7/10851 |
| | | | | 382/312 |
| 2010/0049383 A1 * | 2/2010 | Atmur | .................. | G06Q 10/047 |
| | | | | 701/19 |
| 2010/0082151 A1 * | 4/2010 | Young | .................... | G06Q 10/08 |
| | | | | 700/226 |
| 2010/0302398 A1 * | 12/2010 | An | .......................... | H04N 5/217 |
| | | | | 348/222.1 |
| 2012/0044066 A1 * | 2/2012 | Mauderer | ................. | B60T 7/22 |
| | | | | 340/479 |
| 2012/0051643 A1 * | 3/2012 | Ha | .......................... | B61L 17/00 |
| | | | | 382/182 |
| 2012/0056042 A1 * | 3/2012 | Denny | .................... | B61L 17/02 |
| | | | | 246/122 R |
| 2012/0309422 A1 * | 12/2012 | Lewis-Evans | ...... | B60R 25/1025 |
| | | | | 455/456.1 |
| 2013/0223684 A1 * | 8/2013 | Townend | ........... | G06K 9/00624 |
| | | | | 382/103 |
| 2013/0297633 A1 * | 11/2013 | Edwards | ................. | G06F 17/50 |
| | | | | 707/758 |

(Continued)

*Primary Examiner* — Aaron W Carter
(74) *Attorney, Agent, or Firm* — Global Patent Operation; John A. Kramer

(57) ABSTRACT

A system and method are provided that capture an image of an asset and analyze the captured image to identify an indicium on the asset. The indicium is used, after identification, to identify the asset. The system may also be configured to identify a type of asset, to track the asset, to verify a manifest for a group of assets, or to identify damage to an asset based on comparing the captured image of the asset with a previously captured image of the asset.

20 Claims, 5 Drawing Sheets

(56) References Cited

U.S. PATENT DOCUMENTS

| | | | | |
|---|---|---|---|---|
| 2013/0307979 A1* | 11/2013 | Chen | ................... | G08G 1/0175 |
| | | | | 348/148 |
| 2014/0025542 A1* | 1/2014 | Sharma | ................. | G06Q 10/08 |
| | | | | 705/28 |
| 2014/0085479 A1* | 3/2014 | Haas | ..................... | G06Q 10/08 |
| | | | | 348/159 |
| 2014/0104036 A1* | 4/2014 | Skonberg | ............ | G07C 9/00111 |
| | | | | 340/5.3 |
| 2014/0131434 A1* | 5/2014 | Ozkan | ................. | G06Q 10/087 |
| | | | | 235/375 |
| 2014/0201266 A1* | 7/2014 | Jackson | .............. | G08G 1/0175 |
| | | | | 709/203 |
| 2014/0222971 A1* | 8/2014 | Cooper | .................. | H04L 67/12 |
| | | | | 709/219 |
| 2014/0270467 A1* | 9/2014 | Blemel | ................. | G07D 7/122 |
| | | | | 382/143 |
| 2014/0347511 A1* | 11/2014 | Rodriguez-Serrano | ............. | H04N 5/23222 |
| | | | | 348/222.1 |
| 2015/0105933 A1* | 4/2015 | Martin | ................ | G07C 5/0866 |
| | | | | 701/1 |
| 2015/0124099 A1* | 5/2015 | Evanitsky | .......... | G06K 9/00785 |
| | | | | 348/149 |
| 2015/0336274 A1* | 11/2015 | Connell, II | ............ | B25J 9/1697 |
| | | | | 700/259 |
| 2015/0356520 A1* | 12/2015 | Mitti | .................... | G06Q 10/087 |
| | | | | 705/305 |
| 2016/0068173 A1* | 3/2016 | Fuchs | ................ | B61L 15/0027 |
| | | | | 340/994 |
| 2016/0203591 A1* | 7/2016 | Justaniah | ................ | F25D 11/00 |
| | | | | 348/89 |
| 2016/0221592 A1* | 8/2016 | Puttagunta | .............. | B61L 23/34 |

* cited by examiner

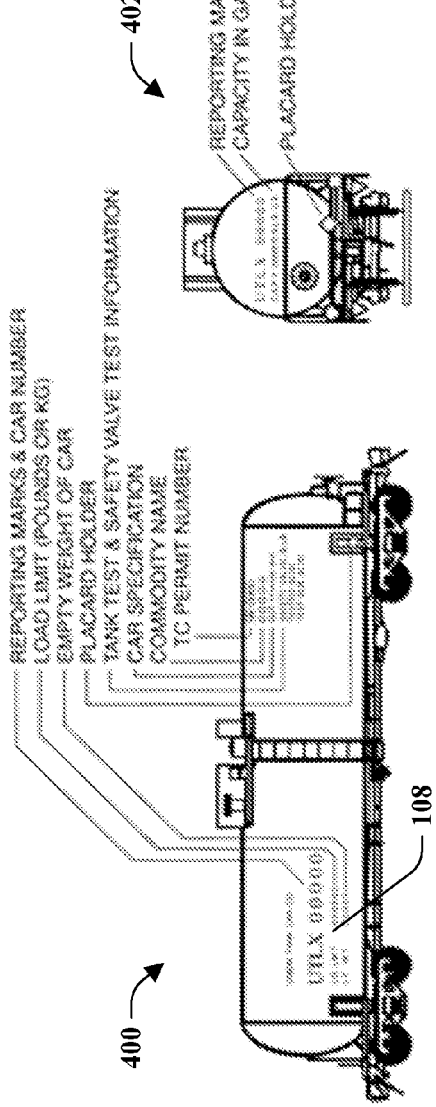
FIG. 4
FIG. 5
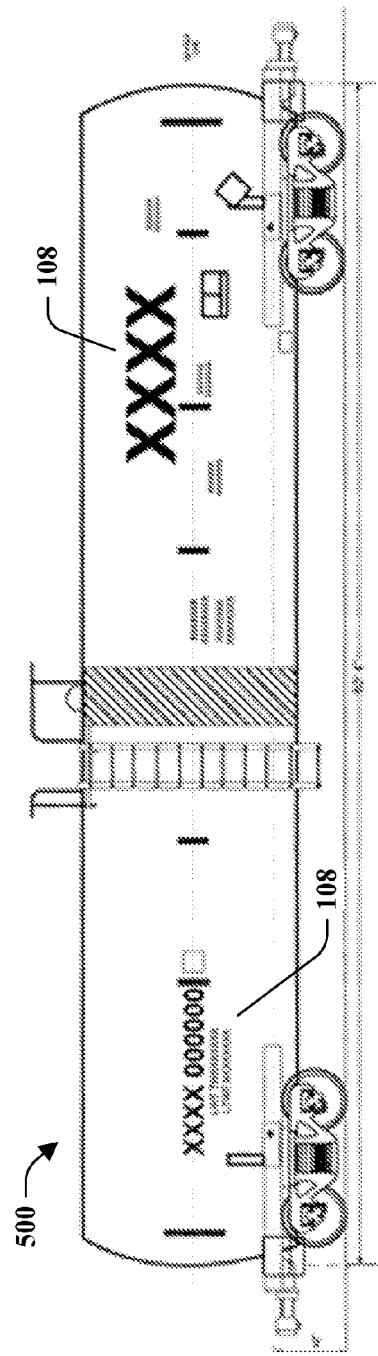
FIG. 6

SYSTEM AND METHOD OF IMAGE ANALYSIS FOR AUTOMATED ASSET IDENTIFICATION

BACKGROUND

Technical Field

Embodiments of the subject matter disclosed herein relate to a system and method of image analysis for automatically identifying assets, and more particularly, analyzing a captured image to identify an asset based on indicia on the asset in the captured image.

Discussion of Art

In many fields, including transportation, a variety of assets may be used in a business operation, and those assets may be owned, leased, and managed by one or more parties, with each party potentially performing multiple roles in the business operation. For mobile assets, due to the vast distances over which the assets may move, and the numerous parties that may have control over or access to the assets, tracking the assets and/or monitoring the condition of the assets has been difficult, time-consuming, cumbersome, and infrequent. For example, an asset can be leased and used to transport cargo across the country with infrequent tracking between the departure location and the arrival location. Additionally, an asset may be used to transport more than one cargo during the trip, complicating the ability to effectively track ownership, responsibility, and, in turn, cost of using the asset.

It may, therefore, be desirable to have a system and method that differs from those systems and methods that are currently available.

BRIEF DESCRIPTION

Presently disclosed is a system that includes a device configured to capture an image of at least a portion of an asset and of an indicium on the asset; and a controller configured to receive the image from the device, determine an asset type of the asset, determine an indicia location based upon the determined asset type, and identify the asset by analyzing at least a portion of the image corresponding to the determined indicia location to determine the indicium that is on the asset.

In some embodiments, the controller is further configured to determine the asset type of the asset by analyzing the image of at least a portion of the asset. In some embodiments, the controller is further configured to determine the asset type of the asset based upon receipt of an electronically communicated asset type identification. In some embodiments, the controller is further configured to access a database containing an association of asset types with indicia locations for the asset types.

In some embodiments, the controller is further configured to associate and store the image with the identification of the identified asset and with at least one of a location where the image was captured and a time when the image was captured.

In some embodiments, the controller is further configured to receive a reference manifest for a plurality of associated assets, wherein the reference manifest defines the plurality of associated assets, generate an image-based manifest for the plurality of associated assets by identifying each asset based on images captured by the device, compare the reference manifest and the image-based manifest to identify differences, and communicate a notification regarding the differences.

In some embodiments, the controller is further configured to retrieve a previous image of the asset from a database, compare the image to the retrieved previous image, determine an indication of wear or damage of the asset based on the comparison of the image and the previous image, and transmit a notification regarding the indication of wear or damage of the asset. In some embodiments, the indication of wear or damage of the asset is one of wear on a wheel of the asset or a dent on the asset. In some embodiments, the indication of wear or damage of the asset is whether a seal is intact on a portion of the asset.

In some embodiments, the controller is further configured to compensate for environmental variance between the image and the retrieved previous image when comparing the image to the retrieved previous image, wherein the variance is at least one of a time of day, a lighting change, and a state of weather, and wherein the state of weather is at least one of a presence of dust, leaves, smoke, snow, rain, and/or fog.

In some embodiments, the asset is a mobile asset, and the device is stationary and positioned proximate to a route over which the asset travels. In some embodiments, the device is a mobile device.

In some embodiments, the controller is further configured to activate the device to capture a second image of the asset that includes the determined indicia location; and identify the asset by analyzing at least a portion of the second image to determine the indicium that is on the asset. In some embodiments, the controller is further configured to activate the device to capture the image in response to receiving a signal associated with the asset being proximate to the device. In some embodiments, the signal is from at least one of a switch coupled to a rail system that that detects the asset being proximate to the device, or a location tracking component of the asset that detects the asset being proximate to the device.

Also disclosed is a method that includes the steps of capturing an image of an asset that includes an indicium, and one or both of a time stamp and a geographic location; identifying an asset type of the asset; determining where the indicium is located on the asset based at least in part on the identification of the asset type; identifying the indicium by analyzing at least a portion of the image corresponding to the location of the indicium; identifying the asset based on the identified indicium; and storing the image associated with identified asset and associated with one or both of the time stamp and geographic location.

In some embodiments, the method also includes matching the identified asset to an inventory list to validate the identification of the asset.

In some embodiments, the method also includes comparing the image with one or more previously captured images of the asset; and determining an indication of wear or damage of the asset based on a comparison of the image and the one or more previously captured images of the asset.

In some embodiments, the method also includes responding to a query about the asset by transmitting a query result that includes a series of images that are a set or subset of the images captured of the asset that are associated with a specified geographic location.

In some embodiments, the method also includes responding to a query about the asset by transmitting a query result that includes a series of images that are a set or subset of the images captured of the asset along a route.

In some embodiments, the method also includes responding to a query about the asset by transmitting a query result that includes a series of images that are a set or subset of the images captured of the asset during a specified time period.

In some embodiments, the method also includes capturing a second image of the asset that includes the determined indicia location, and identifying the indicium by analyzing at least a portion of the second image.

In some embodiments, the method also includes, prior to capturing the second image, modifying a parameter of an image capture device to facilitate identification of the indicium in the second image.

BRIEF DESCRIPTION OF THE DRAWINGS

Reference is made to the accompanying drawings in which particular embodiments are illustrated as described in more detail in the description below, in which:

FIG. 4 is a side view of an asset with one or more indicia and the data represented by the indicia;

FIG. 5 is an end view of the asset of FIG. 4;

FIG. 6 is an illustration of a tank car asset with an indicium;

DETAILED DESCRIPTION

Embodiments of the disclosed subject matter relate to a system and method of image analysis for automated asset identification. In embodiments, the disclosed systems and methods capture an image of an asset and analyze the captured image to identify an indicium on the asset. The system may use one or more images. For instance, a first image may be captured and used to determine an asset type of the asset, and a second image may be captured and used to identify the indicium. In one embodiment, the controller may determine the asset type without an image, and then use the asset type determination to capture an image of the asset that includes the indicium, or to analyze the portion of the captured image that includes the indicium. In yet other embodiments, after identifying a particular asset based on the indicium, the system may be configured to track the location or status of the asset, manage and/or verify a manifest for a group of assets, or identify damage to an asset based on comparing the captured image of the asset with a previously captured image of the asset or a reference image associated with the asset or the particular asset type. In various embodiments, the system may reside in one or more fixed locations, or may be mobile, such as mounted on a vehicle or deployed as a hand-held system. Accordingly, the assets identified by the system may be fixed assets or mobile assets, or a combination of fixed and mobile assets. The disclosed system may be used in a variety of physical locations, such as a shipping yard, a rail yard, a port, a depot, or a plant. In addition, the system may be used with various asset types including railcars, containers, shipping containers, products/materials, or the items to be shipped or delivered.

Figure 1:
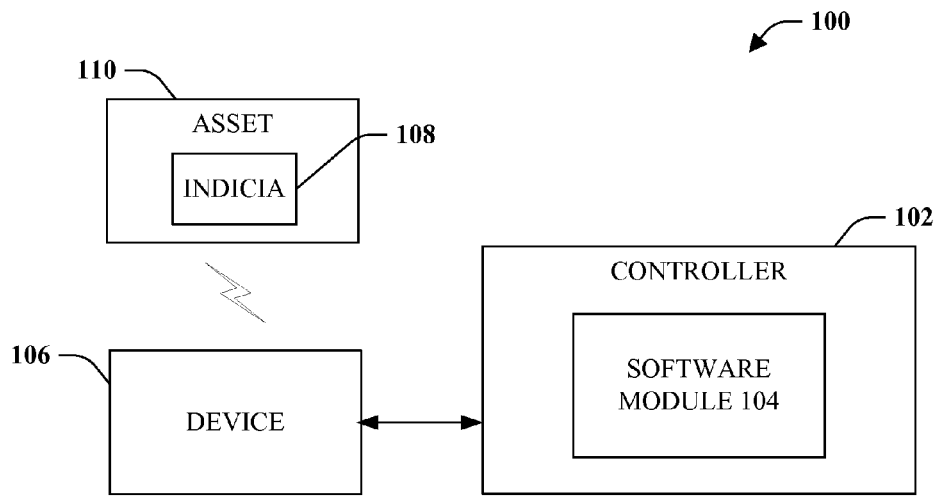
FIG. 1 is an illustration of a system that detects an asset or a type of asset based on a captured image of an indicium.

FIG. 1 illustrates an embodiment of a system 100. The system includes a controller 102, and a device 106 configured to capture an image of an asset 110. As illustrated, the asset 110 includes an indicium 108 and the captured image may also include the indicium. In various embodiments, the controller may include one or more software modules 104 and/or one or more hardware components configured to implement the image analysis functions of the controller. The controller receives the image captured from the device 106. The image may be of at least a portion of the asset, and may also include the indicium. Upon receipt of the image, the controller analyzes the image of the asset. In embodiments, the controller analyzes the image of the asset to identify the indicium on the asset, to determine an asset type of the asset, or to determine a location on the asset that would include the indicium. In one example, the controller analyzes the captured image to determine the asset type, and then determines the expected location of the indicium on the asset based upon the previously determined asset type. The controller may then analyze a portion of the image corresponding to the determined indicia location to determine the indicium that is on the asset. As used herein, an "asset type" refers to a category or classification of the particular asset.

In some embodiments, the system also acquires or generates additional data associated with the captured image. For example, the system may generate a time stamp, or determine a geographic location at which the image was captured. In an embodiment, the controller associates this additional data with the captured image, such as by generating a data package that includes the captured image and the additional data captured (e.g., time stamp, geographic location). The data package may then be referenced by the indicium on the asset that was determined by the system. In other embodiments, the system may identify a condition of the asset, such as a portion of wear or damage to the asset, and include an indication of the condition as part of the additional data stored included in the data package. In yet other embodiments, the additional information may include the type of the asset, the type of the device used to capture the image, or similar information useful in reconstructing the state of the asset at the time the image was captured.

In an example, the controller 102 receives an image from the device 106 and compares the image to data stored in a database or memory. The data can be baseline data defining criteria that indicates a type of the asset, a location of where the indicium is located on the asset, or the asset based on the identified indicium. For instance, the software analysis can be used to identify criteria which can be used to identify matches of the image/indicia with an asset or data package or other corresponding data referenced to the indicium or the asset.

In one embodiment, the system collects images for one or more assets and stores the images in a database with a data reference, wherein the data reference can be the asset, the indicium, a defined owner for the asset, a geographic location, a location of the device, a type of the asset, a time when the image was captured by the device, a date, a year, or a user-defined tag.

In an embodiment, the system can use still or video imaging to acquire the captured image. The device may include a handheld device, a vehicle- or asset-mounted device, or a wayside device configured to capture an image of an asset. In another example, the device can be a smartphone, tablet, or digital camera. Suitable assets may include one or more of railcar, on-highway or over-the-road truck, locomotive, intermodal container, mining equipment, or automobile. Some of these assets may be combined, for example, an intermodal container secured to a railcar. And, some of these assets may be coupled, either mechanically or logically, to form a consist. The asset consist that includes logically coupled vehicles may include one or more remotely controlled vehicles that move relative to each other, whereas mechanically coupled assets in consist is self-explanatory. The image capture event can be either triggered by a human (e.g., user input) or automatically detected based on the presence of an asset in proximity to the image capture device. For example, the system may be configured to capture an image in response to a radio frequency identification (RFID) signal or a Global Positioning System (GPS) signal identifying the asset as being proximate to the system. In other examples, such as a rail system, the system may be configured to capture an image in response to a signal received from a track circuit that indicates an asset is present in a desired location for capturing an image of the asset and the indicium. In yet other examples, the system can be used at an entrance and/or exit of a rail station, a rail yard, a shipping yard, a port, a siding, a depot, a location in which assets congregate, or similar facilities where it may be desired to identify and monitor assets. In various embodiments, after the system analyzes the captured image and identifies the asset, the system may store or communicate the fact that the asset was identified at the system to document move information associated with the asset. As used herein, "move information" refers to the logical tracking of physical movements of an asset.

In some embodiments, after the system identifies an asset based upon the indicium from the captured image, the indicium is validated against a database to ensure the mark is a match. The accuracy of the image analysis may be improved using previous data (e.g., previous captured images) to reduce false positives on matches or to identify an asset when the indicium is partially obscured.

In some embodiments, the system captures one or more images or a video of the asset. In an embodiment, the video captured can be a HEVC codec format, an AVC standard, an MPEG format, H.264/MPEG-4 AVC format, among others. The format can be selected based on application specific requirements.

In another example, the system may control the image capture device based on the identification of where the indicium is located on the asset. For example, the system may adjust a variety of settings (e.g., focal length, aperture size) to improve the quality of the captured image or video. In other embodiments, the device may be mounted on a moveable base allowing the device to be directed at the asset or the portion of the asset that contains the indicium. In this manner, the captured image or video may be improved to facilitate analysis of the image and identification of the asset based upon the indicium.

In some embodiments, the system analyzes the image by accounting for a lighting change, such as may be correlated to the time of day at which the image was captured. Similarly, the system may account for differences in the aim angle for the device in order to improve the quality of the captured image or video for subsequent analysis. In yet other embodiments, the system may capture multiple images from which one image is selected for use (e.g., analysis, storage, etc.).

In an example where the device is incorporated into or mounted on an asset, the device can be used to check other assets that come into view of the asset. For example, if the device were mounted onto a locomotive, the system would see railcars that the locomotive passes, allowing those railcars to be identified and monitored. Since the locomotive may pass railcars in route, monitoring of the assets is facilitated in locations not previously supported by prior systems. Throughout this process, the system may communicate reports of the assets identified including reports of damage incurred since the last update for the asset.

In another example, the system employs one or more filters or image analysis functions that adjust an appearance of the captured image. For instance, the filter or image analysis can adjust the appearance of leaves, weather conditions (e.g., rain, sleet, snow, sun, glare, clouds, fog), dirt, smoke, and dust, among others. In another example, the system may include a heat detection component (such as in infrared camera) that can check heat signatures or other wavelengths. By monitoring infrared, "hot spots" associated with overheating, excessive friction, or other potential problems may be identified while the asset is in motion alerting the asset owner to the need for maintenance or repair.

In an embodiment, the system captures one or more images of an asset and associates such images with a performance data snapshot taken at the same time the image is captured.

The system can include data with a data package created having the indicium, the asset, the time of when the image was captured, and a geographic location of where the image was taken. The data can include a cargo being transported by the asset, a cargo at a time the image was captured for the asset, an owner of the asset, a lease of the asset at the time the image was captured, an operator of the asset at the time the image was captured, a weather condition of when the image was captured (e.g., weather, time of day, pollution levels), among others.

Figure 2:
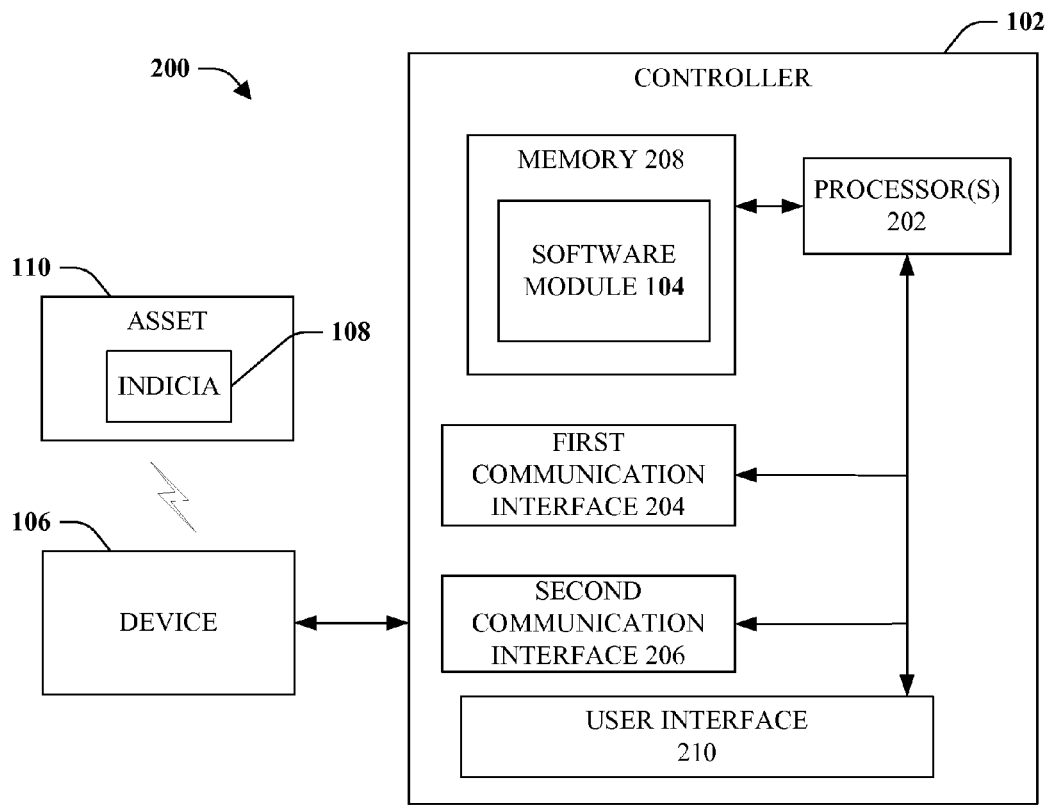
FIG. 2 is an illustration of an embodiment of a system to communicate data related to an asset based on an identified indicium on the asset from a captured image.

Referring now to FIG. 2, another embodiment of a system 200 is illustrated. The system 200 includes a controller and a software module to manage assets based on a captured image of the asset and identification of the indicium. The controller includes one or more processor(s) 202 that can execute computer-executable instructions, such as instructions from the software module. Such computer-executable instructions can be stored on one or more computer-readable media including a non-transitory, computer-readable storage medium such as the memory 208 of the controller.

The controller may include a first communication interface 204 and a second communication interface 206. As shown in FIG. 2, the first communication interface enables and processes electronic communications between the controller and the device. The first communication interface may be a wired or wireless interface including, but not limited, a WiFi interface, an Ethernet interface, a fiber optic interface, a cellular radio interface, a satellite interface, an interface for the Internet, a LAN cable, an Ethernet cable, a USB interface, a serial interface, a short-range RF interface (Bluetooth), an infrared interface, or a near-field communication (NFC) interface. A second communication interface 206 enables and processes electronic communications between the controller and the asset (if applicable). A suitable second communication interface can be a WiFi interface, an Ethernet interface, a fiber optic interface, a cellular radio interface, a satellite interface, an interface for the Internet, a LAN cable, an Ethernet cable, a USB interface, a serial interface, a short-range RF interface (Bluetooth), an infrared interface, or a near-field communication (NFC) interface. While shown as separate components in FIG. 2, the first communication interface and the second communication interface may be a single interface or an interface capable of simultaneous communication over multiple connections.

In some embodiments, the controller further includes a user interface 210 that has various elements to obtain data representative of user input, to convey data representative of user output, to obtain data input from a user, and to perform similar input/output functions with a user. In embodiments, the user interface includes a web interface or webpage that operates as both an input device and an output device. The user interface can include various buttons, switches, keys, a physical or a digital representation of a button or input, a GUI, or a web-based GUI by which a user can input information to a controller 102, and other displays, such as LED indicators by which other information can be output to the user. In addition, the user interface can include various buttons, switches, keys, a physical or a digital representation of a button or input, a GUI, a web-based GUI by which a user can input information to device or the asset, and other displays, such as LED indicators, by which other information can be output to the user.

In accordance with an embodiment, the controller is at least one of a computing device, a network, a server, a website, or the software module executed thereon. In other embodiments, the controller can be other portable form-factors such as a laptop computer, a convertible laptop, a cell phone, a PDA, a pocket computing device, or a watch computing device. That is, the software module can be installed and executed on a computing device that can communicate with the device or a database or a memory 208 storing data related to the indicium, the assets, or the captured images, as described with regard to FIGS. 1-3. Although a single controller is illustrated in FIG. 2, one or more controllers can be utilized with the system. For example, a first controller can be employed to process communications with an image capture device, and a second controller can be employed to process captured image data, while the first computing device and the second computing device communicate with each other.

The controller and/or the software module can be a network or a portion of a network, wherein the network is at least one of a website, a server, a computer, a cloud-service, a processor and memory, or a computing device connected to the Internet that can transmit/receive data with at least one of the device, a datastore, a memory, the asset, or a combination of two or more thereof. The network can be coupled to one or more devices via wired or wireless connectivity in which data communications are enabled between the network and at least one of a second network, a subnetwork of the network, or a combination thereof. Multiple networks can be used with the system and data communication on networks can be selected based on application specific criteria.

Figure 3:
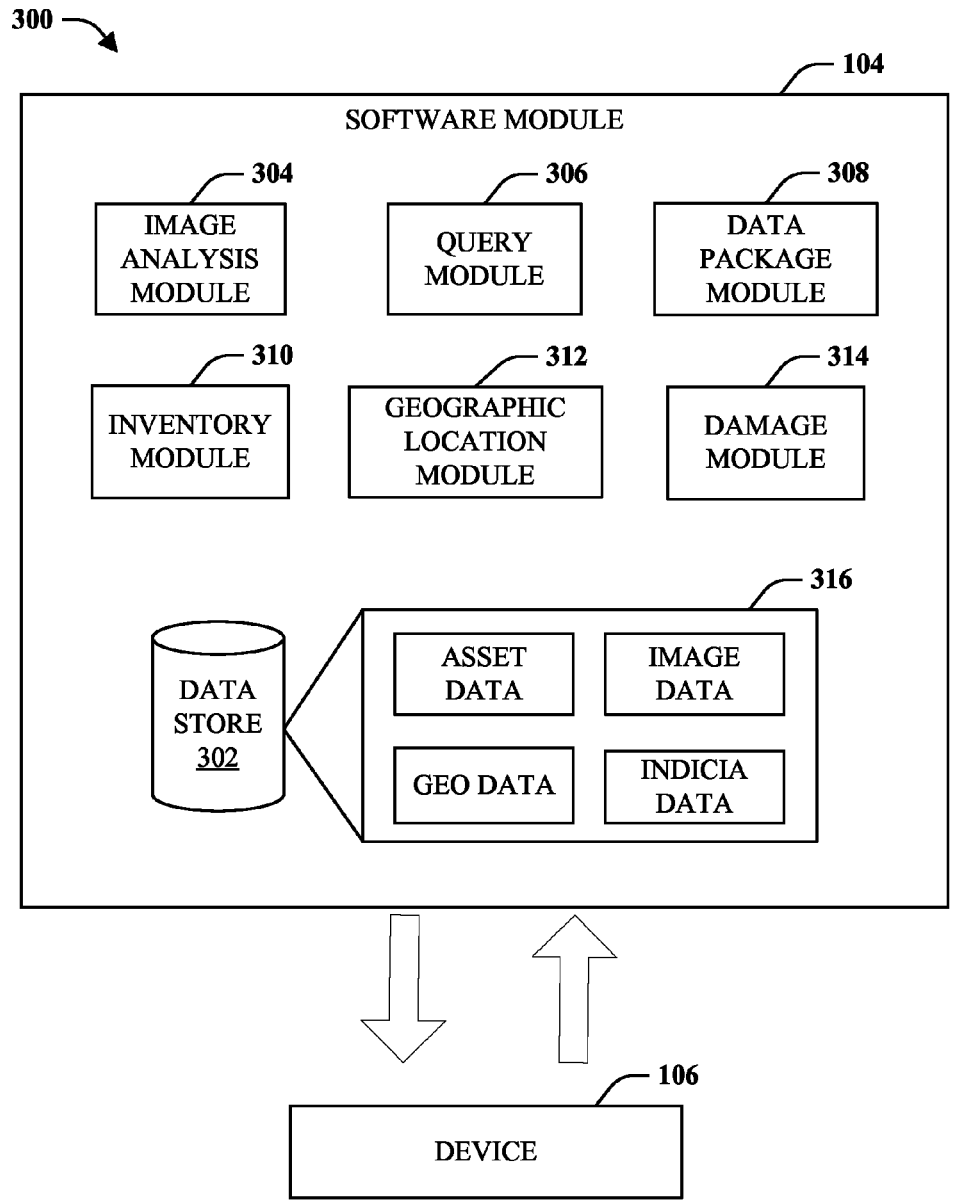
FIG. 3 is a block diagram of an exemplary, non-limiting controller according to one or more aspects.

FIG. 3 illustrates a software application 300 that includes the software module 104 configured to perform data analysis on one or more captured images of the asset. The software application can include a data store 302, image analysis module 304, query module 306, data package module 308, inventory module 310, geographic location module 312, and damage module 314 (collectively referred to as "the modules") and support data 320 stored in the data store. The modules include computer-executable instructions implementing various features, processes, operations, etc. of the software module.

The data store can be, for example, either volatile memory or nonvolatile memory, or can include both volatile and nonvolatile memory. The data store of the subject systems and methods is intended to comprise, without being limited to, these and other suitable types of memory. In addition, the data store can be a server, a database, a hard drive, a flash drive, an external hard drive, a portable hard drive, a cloud-based storage, a solid state drive, and the like.

The data store can store support data utilized by the software module, communicated between the controller and the device, communicated between the controller and the asset, communicated between the controller and another component or device, and/or any combination thereof. Further, the software module can be a stand-alone application on the controller, integrated into the device, integrated into the asset, hosted by a server, hosted by a network, and/or any combination thereof.

The image analysis module can perform one or more image analysis functions on a captured image. The image analysis module can apply a filter to adjust an appearance of the captured image. The image analysis module can perform a first image analysis on a captured image to identify a type of asset. Further, the image analysis module can perform a second image analysis on the captured image to identify the indicium on a location of the asset, wherein the location is identified based on the first image analysis that identified the type of the asset (e.g., each asset type can have a defined location for a location of the indicium). Upon detection and identification of the indicium and/or data representative of the indicium, the software module can evaluate data stored in the datastore to identify data associated with the indicium or the data representative of the indicium.

The image analysis module can further perform an image analysis on a captured image of the asset with a comparison of a previously stored image of the asset in order to detect a change in the asset. In particular, the change can be a portion of wear of the asset, a portion of wear of a portion of the asset, or a damage to the asset or a portion of the asset. Based on such a change, the controller or the software module can communicate an electronic signal indicative of the change. The change can also be, but is not limited to being, an amount of graffiti on the asset, a portion of wear on brakes, whether a seal is intact, whether a tag on a cargo or the asset is intact, a dent, a missing handrail, and the like.

The query module can be configured to receive a data query, analyze the datastore, and communicate a query result to the data query. In particular, the query module can receive a data query related to the asset, a date/time, a geographic location, an indicium, type of damage, a type of an asset, an owner of the asset, a lease party of the asset, a data contained on the asset via the indicium (e.g., see FIG. 4), among others. Based on the data query, a query result can be communicated which satisfies the data query. A data package can be stored that includes at least an image of the asset and a geographic location of where the image was captured. This data package can be provided as a query result to allow images and geographic locations to be communicated.

The data package module can create a data package for an asset which can include one or more images captured for the asset, and a time stamp indicating a time and/or a date of when the image was captured. The data package can further include the indicium, a type of the asset, a cargo transported with the asset, an operator of the asset, an owner of the asset, a type of the device that captured the image, a location of the device, a type of trigger for capturing the image capture, a date of a previous captured image of the asset, a history of the images captured for the asset, among others.

The inventory module can validate or verify a manifest of a group of assets. The inventory module can be configured to generate an image-based manifest of each asset captured for a group of assets or within a duration of time. Moreover, a manifest for the group can be received (e.g., user-generated, created based on a master-manifest, received from a computing device). The inventory module can compare the image-based manifest to the manifest to identify a difference or inconsistency. If a difference or an inconsistency is identified by the comparison, the inventory module can be configured to communicate an electronic signal indicative of such.

The geographic location module can receive a portion of data from the device to identify a geographic location of where an image was captured of the asset. In another example, the geographic location module can generate a geographic location or data representative thereof for the device or for where the image was captured by the device. The geographic location module can store data representative of a physical location on Earth of where the image was captured by the device in, for instance, the datastore. The data representative of the geographic location can be, but is not limited to being, a GPS signal, a GPS coordinate, a mailing address, a reference name for a physical location, a rail yard name, a port name, a depot name, shipper yard name, a zip code, a device reference (e.g., a number or code that can be cross-referenced to a geographic location), among others. The data representative of geographic location of the device or where the image is captured can be selected with sound engineering judgment and/or by one of ordinary skill in the art.

The damage module can compare a captured image with a previous captured image of an asset to identify an amount of damage or a portion of wear on the asset or a portion of the asset. The damage module 314 can be configured to communicate with the image analysis module in order to identify a change or an amount of damage on the asset. Moreover, the damage module can communicate an electronic signal to a repair facility based on the type of damage or where the damage is detected on the asset. For instance, if a wheel on the asset is detected as worn based on the comparison of images, the damage module can communicate an electronic signal to a repair shop or contact that handles repairs on the wheel.

As shown in FIG. 3, the software module includes various support data 320. The support data may include asset data (e.g., data related or associated with the asset, type of asset, history of travel for the asset, cargo of asset, weight of asset, capacity of asset, owner of asset, history of lease, cost of asset, repair history of asset, among others), image data (e.g., device that captured the image, location of device, operator of the device that took the image, time when the image was captured, date of when the image was taken, format of the image captured, among others), geographic location data (e.g., mailing address, data representative of a location on Earth, data related to entry type of location such as manual enter or automatic enter, type of location identification such as by a cellular triangulation or a GPS signal, among others), indicia data (e.g., data of the indicium, type of indicium, location of the indicium on the asset, data that is identified from a cross-reference to the indicium, among others). Although depicted as being incorporated into the software module, the datastore can be a stand-alone component, a server, a networked device, a cloud-based storage, a combination thereof, among others. The selection can be made based on the specific circumstances of the application.

Turning to FIGS. 4-5, a vehicle is illustrated that has indicia on a side portion 400 and on an end portion 402. For purpose of illustration, the indicia on the side portion and the end portion both include an identifier, "UTLX 00000" as well as other information relating to the asset. Depending on the specific asset type, the indicia can include information such as reporting marks, car number, load limit, empty weight of car, placard holder, tank test information, safety valve test information, car specification, commodity name, permit information, capacity, and other information. In some embodiments, the indicia may include one or more numbers or letters. In other embodiments, the indicia may include graphical elements, such as an image, a barcode, a Quick Response (QR) code, or a 3D barcode.

The position of the indicia on the asset may be determined based on one or more factors. These factors may include the available structure of the particular vehicle type, regulatory requirements, available angles of view, historical considerations, among others. On a given asset type, however, the position of the indicia will often be standardized based upon the features of that particular asset type.

Figure 7:
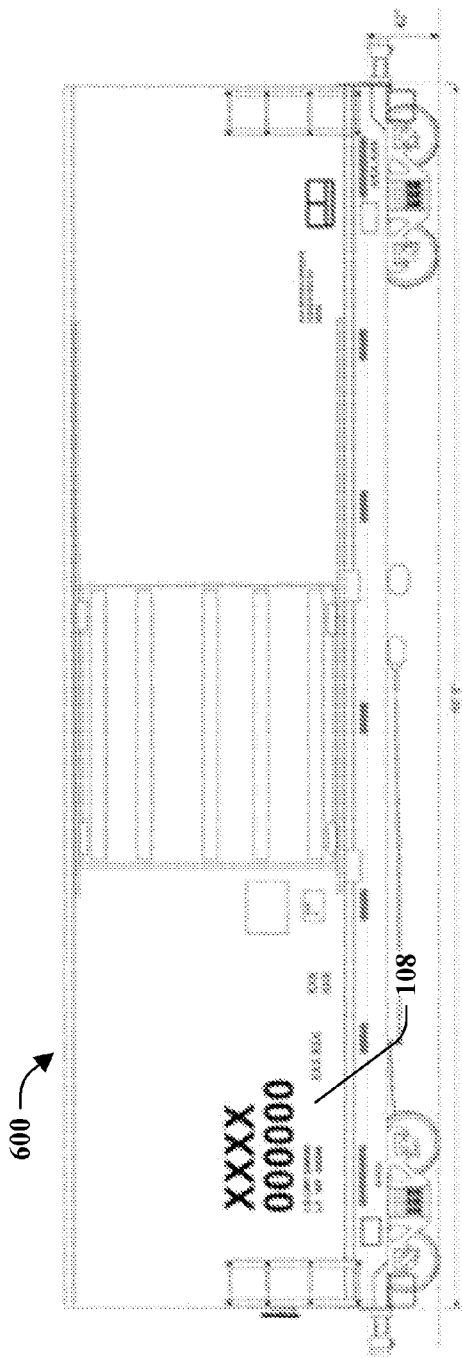
FIG. 7 is an illustration of a box car asset with an indicium.
Figure 8:
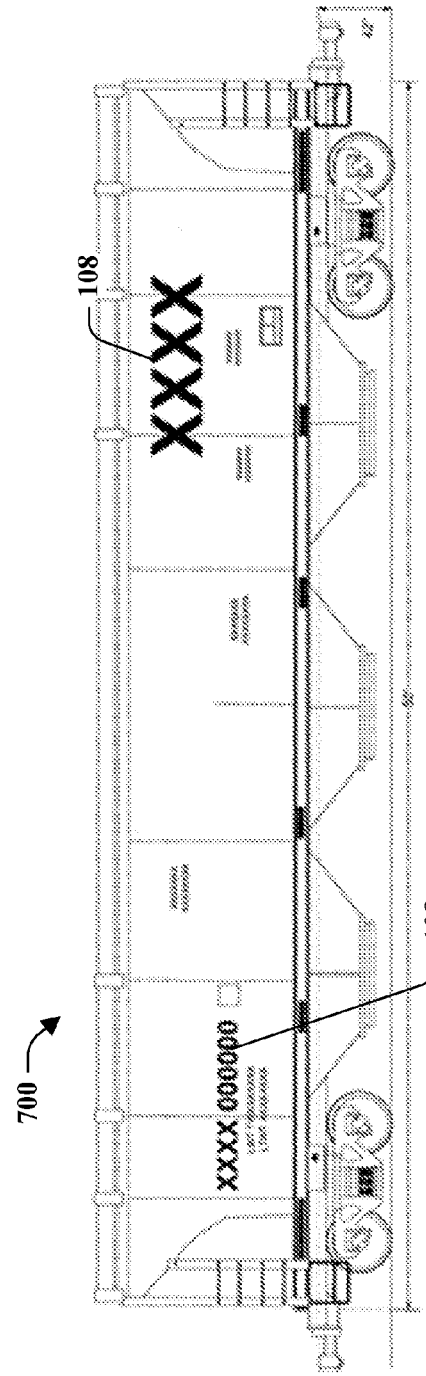
FIG. 8 is an illustration of a hopper car asset with an indicium.
Figure 9:
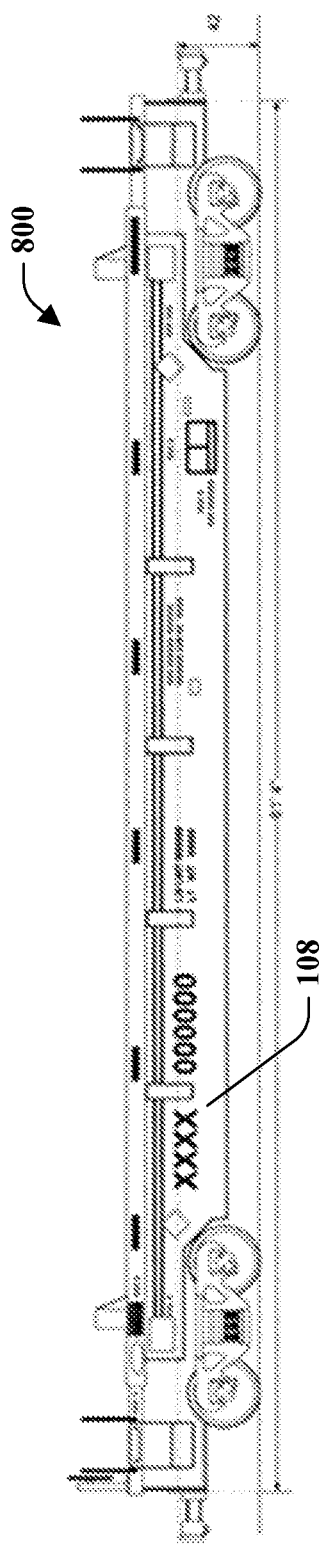
FIG. 9 is an illustration of a flat car asset with an indicium.

FIGS. 6-9 illustrate exemplary assets each having an indicium identifying the asset. FIG. 6 illustrates a tank car 500. FIG. 7 illustrates a box car 600. FIG. 8 illustrates a hopper car 700. FIG. 9 illustrates a flat car 800. In each example, the position of the indicium on the asset is associated with the asset type. Accordingly, by identifying the asset type for a particular asset, the system may analyze a captured image, or the portion of a captured image, that contains the indicium for that particular asset.

In an embodiment, the system generates an image-based manifest that is a listing of two or more assets identified based on images captured by the device, receives data representative of a manifest for a group of two or more assets, in which the manifest defines each asset in the group and the type of asset in the group, compares the image-based manifest to the manifest, and communicates a signal representative of a confirmation the image-based manifest is validated by the manifest or an alert the image-based manifest is not validated by the manifest.

In an embodiment, the system communicates the image, the associated inventory list item, the location information, and the time information. In an embodiment, the system retrieves a previous image of the asset from a database, compares the image to the retrieved previous image, determines if there are differences between the image and the previous image indicated of wear or damage of the asset, and optionally, transmits a notification regarding one or both of the presence or absence of wear or damage of the asset.

In an embodiment, the system compares the image to the retrieved previous image to detect a wear on a wheel of the asset or a dent on the asset. In an embodiment, the system analyzes the image to compensate for one or more differences in the capturing of the image. Such differences that may be compensated include a time of day the image was captured or a lighting change when the image was captured. By adjusting the image properties (e.g., brightness, contrast, etc.), relevant details may be enhanced, improving the identification of wear or damage on the asset. In another embodiment, the system determines whether a seal is intact on a portion of the asset by analyzing the captured image to identify a rupture in the seal or indications of leakage. In another embodiment, the system analyzing the image to determine a change to a portion of the asset, such as wear of a brake or a wheel. In yet another embodiment, the system analyzes the image to identify alteration to a surface of the asset, such as changes to the paint or rusting of the surface.

In an embodiment, the previously stored image is captured from a stationary camera affixed on or near the rail system and stored in the data store. The capture may be automatic in response to a trigger event. In an embodiment, the previously stored image is captured from a mobile device by a user and stored in the data store. In an embodiment, the previously stored image is captured from a camera affixed on or in at least one of the consist or the portion of the consist. In an embodiment, the software module is executed by a processor for enabling the processor to query the data store for data related to a queried portion of a consist, wherein the query result includes the geographic location, the time stamp, and the indicium for the portion of the queried portion of the consist.

In an embodiment, the image is a digital image or a portion of a digital video. In an embodiment, the software module is executed by a processor for enabling the processor to communicate an electronic signal that invokes the device to capture and store the image on the memory. In an embodiment, the electronic signal is from at least one of a switch coupled to the rail system, a switch located proximate to the rail system to detect the portion of the consist, a component that tracks a geographic location of the portion of the consist, or a user input.

In an embodiment, the software module is executed by a processor for enabling the processor to perform a second image analysis on the image and the previously stored image, wherein the second image analysis is a comparison between the image and the previously stored image of the portion of the vehicle(s) of which results in identifying a physical damage to an area of the vehicle(s).

Embodiments of the disclosed system may facilitate a variety of methods which are also disclosed. In an embodiment, a method is disclosed for utilizing the disclosed system, including a controller and/or a software module, to process a captured image to identify an asset. An image is captured of an asset that includes an indicium, and one or both of a time stamp and a geographic location. An asset type of the asset is then identified and the location of the indicium on the asset is determined based on the identification of the asset type. The asset is identified based at least on the indicium. A match to an inventory list may be performed, such as to verify the identified asset is intended to be in a group of assets being identified. The captured image, the identification of the asset, and optionally one or more of the time stamp, the asset type, and the geographic location, may be aggregated and stored as a record. In some embodiments, the system may generate a logical move to reflect the asset's position at the location of system at the time the image was captured.

In another embodiment, a method is disclosed for utilizing the disclosed system, including a controller and/or a software module, to process one or more data packages for assets that include an asset and an image of the asset. An image of a portion of a consist is captured in which the portion of the consist includes an indicium. The system determines or receives a time stamp of when the step of capturing the image occurs, and a geographic location of where the image capture occurred. The image is analyzed to identify the indicium, and the indicium is used to identify the asset. A data package is created and stored that contains at least the captured image, the identification of the asset, the time stamp, and the geographic location. A plurality of data packages for a plurality of assets may then be analyzed by the system. For example, a query of the stored data packages is made for all packages associated with a given asset. A plurality of data packages for a given asset may be returned that include the captured images, the time stamps, and the geographic locations of the given asset. A time sequence of the images of the asset may then be analyzed to review the status of the asset across time. In this manner, any wear or damage to the asset can be identified and the approximate time and/or location at which such wear or damage occurred can be determined.

In an embodiment, a method includes comparing the captured image with one or more previously captured images of the asset; and detecting a change in an area between the image and the one or more previously captured images of the asset, wherein the change is indicative of a physical difference of the areas of the asset.

In an embodiment, a method includes responding to a query about the asset by transmitting a query result that includes the image, and one or more of: the geographic location, or a series of images that are a set or subset of the images captured of the asset at the geographic location; a time of the time stamp or a series of images that are a set or subset of the images captured of the asset at the time of the time stamp; a damage notice for two or more assets; and a set of the images captured for the asset along a route or over time.

In an embodiment, a method includes receiving a query for a location of the portion of the consist, wherein the query includes data representative of the indicium; transmitting a query result for the query that includes the geographic location at the time stamp for the portion of the vehicle, wherein geographic location and the time stamp are a most recent in time included with the data package.

In an embodiment, the following method steps can be performed with one or more processors and/or memory: capturing an image of an asset that includes an indicium, and one or both of a time stamp and a geographic location; identifying the asset type and determining where the indicium is located on the asset based on the identification of the asset type; identifying the indicium; identifying the asset based at least on the indicium and the asset type matching to an inventory list; and generating a data package that includes at least the image, and one or more of the time stamp, the asset type, and the geographic location.

In an embodiment, the following method steps can be performed automatically with one or more processors and/or memory: capturing an image of a portion of a consist in which the portion of the consist includes an indicium; storing the image of the portion of the consist, a time stamp of when the step of capturing the image occurs, and a geographic location, at the time stamp, of where the step of capturing the image occurs; performing an image analysis on the image to detect a data indicative of the indicium; querying with the data indicative of the indicium; receiving a data package, representative of the portion of the consist, as a query result in response to the step of querying with the data indicative of the indicium; and including the image, the time stamp, and the geographic location with the data package.

In an embodiment, a system comprises a device that is configured to capture and store an image on a memory, wherein the image is of a portion of a consist that couples to a rail system and each portion of the consist includes an indicium (e.g., each portion includes a respective indicium). The system further comprises one or more processors/controllers that are configured (based on software stored in memory, for example) to receive the image from the memory, and perform a first image analysis on the image, wherein the first image analysis results in identifying the indicium from the image. The one or more processors are further configured to query a data store with the indicium to receive a query result that is a data representative of the portion of the consist, wherein the data representative of the portion of consist includes a previously stored image of the portion of the consist. The one or more processors are further configured to perform a second image analysis on the image and the previously stored image, wherein the second image analysis is a comparison between the image and the previously stored image of the portion of the consist which results in identifying a change to an area of the consist. The one or more processors are further configured to store, on the memory, and upon (e.g., responsive to) capture of the image of the portion of the consist by the device: a time stamp of when the image was captured, and a geographic location of where the image was captured. The one or more processors are further configured to track an inventory of one or more consists for a rail yard based on evaluating the time stamp and the geographic location.

As used herein, the terms "component" and "module," as well as forms thereof are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

An "application" or "system" can include one or more components or modules that perform one or more functionalities via instructions stored on a memory executed by a processor. Moreover, although some functionality may be described as a single module, multiple functionalities may be allocated between one or more modules. Additionally, one or more applications can be provided to include the one or more modules described herein The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided for purposes of clarity and understanding and are not meant to limit or restrict the claimed subject matter or relevant portions of this disclosure in any manner.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the invention, including the best mode, and also to enable one of ordinary skill in the art to practice the invention, including making and using a devices or systems and performing incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A system comprising:
a device that is configured to capture and store an image on a memory, wherein the image is of a portion of a consist that couples to a rail system and each portion of the consist includes an indicium;
one or more software modules that are configured to be executed by one or more processors for enabling the one or more processors to receive the image from the memory, determine a type of rail vehicle in the portion of the consist based on the image, determine an indicia location based on the type of rail vehicle that is determined, and perform a first image analysis on the image based on the indicia location that is determined, wherein the first image analysis results in identifying the indicium from the image;
the one or more software modules further configured to enable the one or more processors to query a data store with the indicium to receive a query result that is a data representative of the portion of the consist, wherein the data representative of the portion of consist includes a previously stored image of the portion of the consist;
the one or more software modules also configured to enable the one or more processors to perform a second image analysis on the image and the previously stored image, wherein the second image analysis is a comparison between the image and the previously stored image of the portion of the consist which results in identifying a change to an area of the consist;
the one or more software modules also configured to enable the one or more processors to store, on the memory, the following data upon capture of the image of the portion of the consist by the device: a time stamp of when the image was captured, and a geographic location of where the image was captured;
the one or more software modules further configured to enable the one or more processors to track an inventory of one or more consists for a rail yard based on evaluating the time stamp and the geographic location and respond to a query about the consist by communicating a query result that includes the image of the consist and that includes a geographic location of where the image was captured.

2. The system of claim 1, wherein each portion of the consist comprises one or more rail vehicles.

3. The system of claim 2, wherein the one or more software modules are further configured to enable the one or more processors to identify the one or more rail vehicles by analyzing a least a portion of the image corresponding to the determined indicia to determine the indicium that is on the vehicle.

4. The system of claim 3, wherein the one or more software modules are further configured to enable the one or more processors to:
associate and store the image with the identification of the identified one or more rail vehicles and with at least one of a location where the image was captured or a time when the image was captured.

5. The system of claim 2, wherein the one or more software modules are further configured to enable the one or more processors to:
receive a reference manifest for a plurality of associated rail vehicles, wherein the reference manifest defines the plurality of associated rail vehicles,
generate an image-based manifest for the plurality of associated rail vehicles by identifying each rail vehicle based on images captured by the device,
compare the reference manifest and the image-based manifest to identify differences, and
communicate a notification regarding the differences.

6. The system of claim 2, wherein the one or more software modules are further configured to enable the one or more processors to:
retrieve a previous image of the portion of the consist from a database,
compare the image to the retrieved previous image,
determine an indication of at least one of wear or damage of the one or more rail vehicles based on the comparison of the image and the previous image, and
transmit a notification regarding the indication of wear or damage of the one or more rail vehicles.

7. The system of claim 6, wherein the indication of wear or damage of the one or more rail vehicles is one of wear on a wheel of the one or more rail vehicles or a dent on the one or more rail vehicles.

8. The system of claim 6, wherein the indication of wear or damage of the one or more rail vehicles is whether a seal is intact on a portion of the one or more rail vehicles.

9. The system of claim 6, wherein the one or more software modules are further configured to enable the one or more processors to compensate for environmental variance between the image and the retrieved previous image when comparing the image to the retrieved previous image, wherein the variance is at least one of a time of day, a lighting change, or a state of weather, and wherein the state of weather is at least one of a presence of dust, leaves, smoke, snow, rain, or fog.

10. The system of claim 2, wherein the one or more software modules are further configured to enable the one or more processors to:
activate the device to capture a second image of the portion of the consist that includes the determined indicia location; and
identify the one or more rail vehicles by analyzing at least a portion of the second image to determine the indicium that is on the one or more rail vehicles.

11. The system of claim 2, wherein the one or more software modules are further configured to enable the one or more processors to:
activate the device to capture the image in response to receiving a signal associated with the portion of the consist being proximate to the device.

12. The system of claim 11, wherein the signal is from a switch coupled to the rail system that detects the portion of the consist being proximate to the device.

13. The system of claim 11, wherein the signal is from a location tracking component of the one or more rail vehicles that detects the portion of the consist being proximate to the device.

14. The system of claim 1, wherein the one or more software modules are further configured to enable the one or more processors to determine the type of rail vehicle by analyzing the image of the portion of the consist.

15. The system of claim 14, wherein the one or more rail vehicles are at least one of a tank car, a box car, a hopper car, a flat car, or a locomotive.

16. The system of claim 14, wherein the one or more rail vehicles include an intermodal container.

17. The system of claim 1, wherein the one or more software modules are further configured to enable the one or more processors to determine the type of rail vehicle further based upon receipt of an electronically communicated asset type identification.

18. The system of claim 1, wherein the one or more software modules are further configured to enable the one or more processors to access a database containing an association of types of rail vehicles with indicia locations for the types of rail vehicles.

19. The system of claim 1, wherein the device is stationary and positioned proximate to a route over which the portion of the consist travels.

20. The system of claim 1, wherein the device is a mobile device.

* * * * *